(12) United States Patent
Cui et al.

(10) Patent No.: US 12,431,994 B2
(45) Date of Patent: Sep. 30, 2025

(54) TECHNIQUES FOR PATHLOSS REFERENCE SIGNAL MEASUREMENT IN UNLICENSED BANDS

(71) Applicant: Apple Inc., Cupertino, CA (US)

(72) Inventors: Jie Cui, San Jose, CA (US); Yang Tang, San Jose, CA (US); Qiming Li, Beijing (CN); Xiang Chen, Campbell, CA (US); Manasa Raghavan, Sunnyvale, CA (US); Huaning Niu, San Jose, CA (US); Hong He, San Jose, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 77 days.

(21) Appl. No.: 17/593,838

(22) PCT Filed: Jan. 14, 2021

(86) PCT No.: PCT/CN2021/071859
§ 371 (c)(1),
(2) Date: Jul. 21, 2022

(87) PCT Pub. No.: WO2022/151210
PCT Pub. Date: Jul. 21, 2022

(65) Prior Publication Data
US 2023/0361896 A1 Nov. 9, 2023

(51) Int. Cl.
*H04B 17/309* (2015.01)
*H04W 24/08* (2009.01)
(52) U.S. Cl.
CPC .......... *H04B 17/347* (2023.05); *H04W 24/08* (2013.01)
(58) Field of Classification Search
CPC ... H04B 17/347; H04B 17/309; H04W 24/08; H04W 16/14; H04W 24/04;
(Continued)

(56) References Cited

U.S. PATENT DOCUMENTS

2015/0139003 A1 5/2015 Takahashi
2016/0227428 A1 8/2016 Novlan
(Continued)

FOREIGN PATENT DOCUMENTS

CN 110535605 A 12/2019
WO 2016119325 A1 8/2016
(Continued)

OTHER PUBLICATIONS

3GPP TSG-RAN WG4 RAN4#93; R4-1914980; Source: Qualcomm; Title: Applicable timing for pathloss RS activated/updated by MAC-CE; Reno, Nevada Nov. 18-22, 2019. (Year: 2019).*
(Continued)

*Primary Examiner* — Mohammed S Chowdhury
(74) *Attorney, Agent, or Firm* — Blank Rome LLP

(57) ABSTRACT

A technique for wireless communications in a wireless system including: receiving, by a wireless device, a request to perform a pathloss reference signal (PLRS) measurement procedure in an unlicensed band, wherein the wireless device is configured to accumulate a first number of PLRS measurements within a PLRS switching period to perform the PLRS measurement procedure, wherein the first number of PLRS measurements is more than one, measuring, by the wireless device, a second number of PLRS signals during the PLRS switching period, wherein the second number is less than the first number of PLRS measurements within the PLRS switching period, determining, by the wireless device, to extend the PLRS switching period, and listening, by the wireless device, for a PLRS signal during the extended PLRS switching period.

19 Claims, 13 Drawing Sheets

(58) Field of Classification Search
CPC ............ H04W 52/242; H04W 74/0808; H04L 5/0048; H04L 5/0051
See application file for complete search history.

(56) References Cited

U.S. PATENT DOCUMENTS

| | | | |
|---|---|---|---|
| 2016/0278125 A1 | 9/2016 | Liao | |
| 2020/0389852 A1* | 12/2020 | Wang | ................... H04W 72/046 |
| 2021/0153003 A1* | 5/2021 | Zhou | ..................... H04W 52/06 |
| 2023/0023600 A1* | 1/2023 | Cirik | .................... H04W 52/242 |
| 2023/0028423 A1* | 1/2023 | Xu | ...................... H04B 7/06966 |
| 2023/0072323 A1* | 3/2023 | Matsumura | ........... H04L 5/0023 |
| 2023/0080431 A1* | 3/2023 | Matsumura | ........... H04L 5/0048 |

FOREIGN PATENT DOCUMENTS

| | | |
|---|---|---|
| WO | 2017012346 A1 | 1/2017 |
| WO | 2017047988 A1 | 3/2017 |
| WO | 2020247217 A1 | 12/2020 |

OTHER PUBLICATIONS

3GPP TSG RAN WG1 #99; R1-1912824; Source: Apple Inc.; Title: Remaining Issues on Multi-beam operation; Reno, USA, Nov. 18-22, 2019 (Year: 2019).*

Moderator (Mediatek Inc.), Email discussion summary for RAN4#94e_#47_NR_unlic_RRM_Core_Part_2 3GPP TSG-RAN WG4 Meeting #94-e R4-2002301, Mar. 6, 2020 (Mar. 6, 2020).

Apple: "On applicable timing for pathloss RS activated/updated by MAC-CE", 3GPP Draft; R4-1913503, 3rd Generation Partnership Project (3GPP), Mobile Competence Centre ; 650, Route Des Lucioles ; F-06921 Sophia-Antipolis Cedex ; France, vol. RAN WG4, No. Reno, NV, USA; Nov. 18, 2019-Nov. 22, 2019 Nov. 8, 2019 (Nov. 8, 2019), XP051822529, Retrieved from the Internet: URL:https://ftp.3gpp.org/tsg_ran/WG4_Radio/TSGR4 93/Docs/R4-1913503.zip R4-1913503 On applicable timing for pathloss RS activated or updated by MAC-CE.docx [retrieved on Nov. 8, 2019].

* cited by examiner

TECHNIQUES FOR PATHLOSS REFERENCE SIGNAL MEASUREMENT IN UNLICENSED BANDS

FIELD

The present application relates to wireless devices, and more particularly to apparatus, systems, and methods for performing pathloss reference signal (PLRS) measurement in unlicensed bands in a wireless communication system.

BACKGROUND

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UNITS (associated with, for example, WCDMA or TD-SCDMA air interfaces), LTE, LTE Advanced (LTE-A), 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR communication. Accordingly, improvements in the field in support of such development and design are desired.

SUMMARY

Embodiments relate to apparatuses, systems, and methods for performing PLRS measurement in wireless communication systems. Performing PLRS measurements in NR unlicensed (NR-U) can be challenging due to restrictions that may come from operating in unlicensed frequencies. For example, a wireless system operating in unlicensed frequencies may be subject to listen before talk (LBT) restrictions where the wireless devices sense the frequencies prior to transmitting to determine whether an LBT failure has occurred as another wireless device is already accessing the frequencies. If a wireless device uses multiple samples to perform a PLRS measurement procedure and an LBT failure occurs when one of the PLRS samples are expected, the wireless device may need to extend a measurement period in which the wireless device can obtain PLRS samples. Extending the measurement period may introduce issues where additional PLRS samples may be too far apart in time for a reliable PLRS measurement procedure to be performed. Thus, proposed herein are techniques for extensions and various restrictions on extensions to reference signals measurement (e.g., PLRS measurement).

According to aspects of the present disclosure, a technique for wireless communications in a wireless system including: receiving, by a wireless device, a request triggering a pathloss reference signal (PLR S) measurement procedure in an unlicensed band, wherein the wireless device is configured to accumulate a first number of PLRS measurements within a PLRS switching period to perform the PLRS measurement procedure, wherein the first number of PLRS measurements is more than one; measuring, by the wireless device, a second number of PLRS signals during the PLRS switching period, wherein the second number is less than the first number of PLRS measurements within the PLRS switching period; determining, by the wireless device, to extend the PLRS switching period; and listening, by the wireless device, for a PLRS signal during the extended PLRS switching period.

Another aspect relates to a wireless device comprising: an antenna; a radio operably, coupled to the antenna; and a processor operably coupled to the radio, wherein the wireless device is configured to: receive a request triggering a pathloss reference signal (PLRS) measurement procedure in an unlicensed band, wherein the wireless device is configured to accumulate a first number of PLRS measurements within a PLRS switching period to perform the PLRS measurement procedure, wherein the first number of PLRS measurements is more than one; measure a second number of PLRS signals during the PLRS switching period, wherein the second number is less than the first number of PLRS measurements within the PLRS switching period; determine to extend the PLRS switching period; and listen by the wireless device, for a PLRS signal during the extended PLRS switching period.

The techniques described herein may be implemented in and/or used with a number of different types of devices, including but not limited to cellular phones, tablet computers, wearable computing devices, portable media players, and any of various other computing devices.

This Summary is intended to provide a brief overview of some of the subject r patter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

A better understanding of the present subject matter can be obtained when the following detailed description of various embodiments is considered in conjunction with the following drawings, in which.

Figure 1:
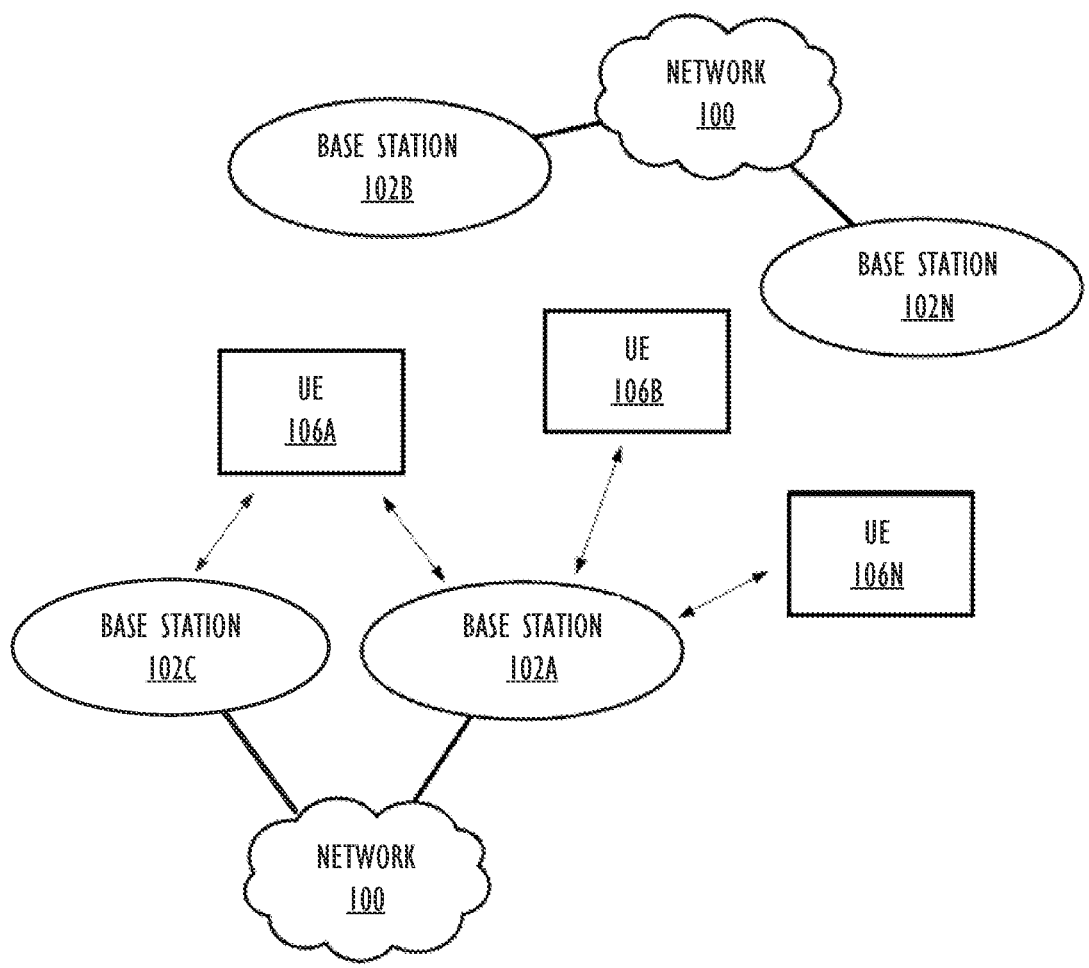
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

The following is a glossary of terms that may be used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores) A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (also "User Device" or "UE Device")—any of various types of computer systems or devices that are mobile or portable and that perform wireless communications. Examples of UE devices include mobile telephones or smart phones iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, other handheld devices, in-vehicle infotainment (WI), in-car entertainment (ICE) devices, an instrument cluster, head-up display (HUD) devices, onboard diagnostic (OBD) devices, dashtop mobile equipment (DME), mobile data terminals (MDTs), Electronic Engine Management System (EEMS), electronic/engine control units (ECUs), electronic engine control modules (ECMs), embedded systems, microcontrollers, control modules, engine management systems (EMS), networked or "smart" appliances, machine type communications (MTC) devices, machine-to-machine (M2M), internet of things (IoT) devices, etc. In general, the term "LE" or "LIE device" can be broadly defined to encompass any electronic, computing, and/or telecommunications device (or combination of devices) which is transportable by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "base station" or "wireless station" has the full breadth of its ordinary meaning, and at least includes a wireless communication station installed at a fixed location and used to communicate as part of a wireless telephone system or radio system. For example, if the base station is implemented in the context of LTE, it may alternately be referred to as an 'eNodeB' or 'eNB'. If the base station is implemented in the context of 5G NR, it may alternately be referred to as a 'gNodeB' or 'gNB'. Although certain aspects are described in the context of LTE or 5G NR, references to "eNB," "gNB," "nodeB," "base station," "NB," etc., may refer to one or more wireless nodes that service a cell to provide a wireless connection between user devices and a wider network generally and that the concepts discussed are not limited to any particular wireless technology. Although certain aspects are described in the context of LIE or 5G NR, references to "eNB," "gNB," "nodeB," "base station," "NB," etc., are not intended to limit the concepts discussed herein to any particular wireless technology and the concepts discussed may be applied in any wireless system.

Node—The term "node," or "wireless node" as used herein, may refer to one more apparatus associated with a cell that provide a wireless connection between user devices and a wired network generally.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any, of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz vide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some aspects, "approximately" may mean within 0.1% of some specified or desired value, while in various other aspects, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Example Wireless Communication System

Turning now to FIG. 1, a simplified example of a wireless communication system is illustrated, according to some embodiments. It is noted that the system of FIG. 1 is merely one example of a possible system, and that features of this disclosure may be implemented in any of various systems, as desired.

As shown, the example wireless communication system includes a base station 102A, which communicates over a transmission medium with one or more user devices 1106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station"), and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATS), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells." Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some embodiments, base station 102A may be a next generation base station, e.g., a 5G New Radio (5G NR) base station, or "gNB." In some embodiments, a gNB may be connected to a legacy evolved packet core (EPC) network and/or to a NR core (NRC)/5G core (5GC) network. In addition, a gNB cell may include one or more transition and reception points (TRPs). In addition, a UE capable of operating according to 5G NR may be connected to one or more TRPs within one or more gNBs. For example, it may be possible that the base station 102A and one or more other base stations 102 support joint transmission, such that UE 106 may be able to receive transmissions from multiple base stations (and/or multiple TRPs provided by the same base station). For example, as illustrated in FIG. 1, both base station 102A and base station 102C are shown as serving UE 106A.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

Example User Equipment (UE)

Figure 2:
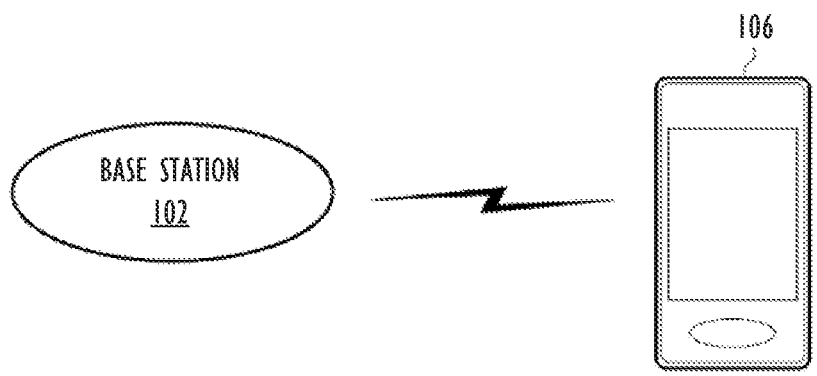
FIG. 2 illustrates a base station (BS) in communication with a user equipment (LIE) device, according to some embodiments.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, NR or LTE using at least some shared radio components. As additional possibilities, the UE 106 could be configured to communicate using CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1×RTT, or either of LTE or GSM, among various possibilities), and separate radios for communicating using each of Wi-Fi and Bluetooth. Other configurations are also possible.

Example Communication Device

Figure 3:
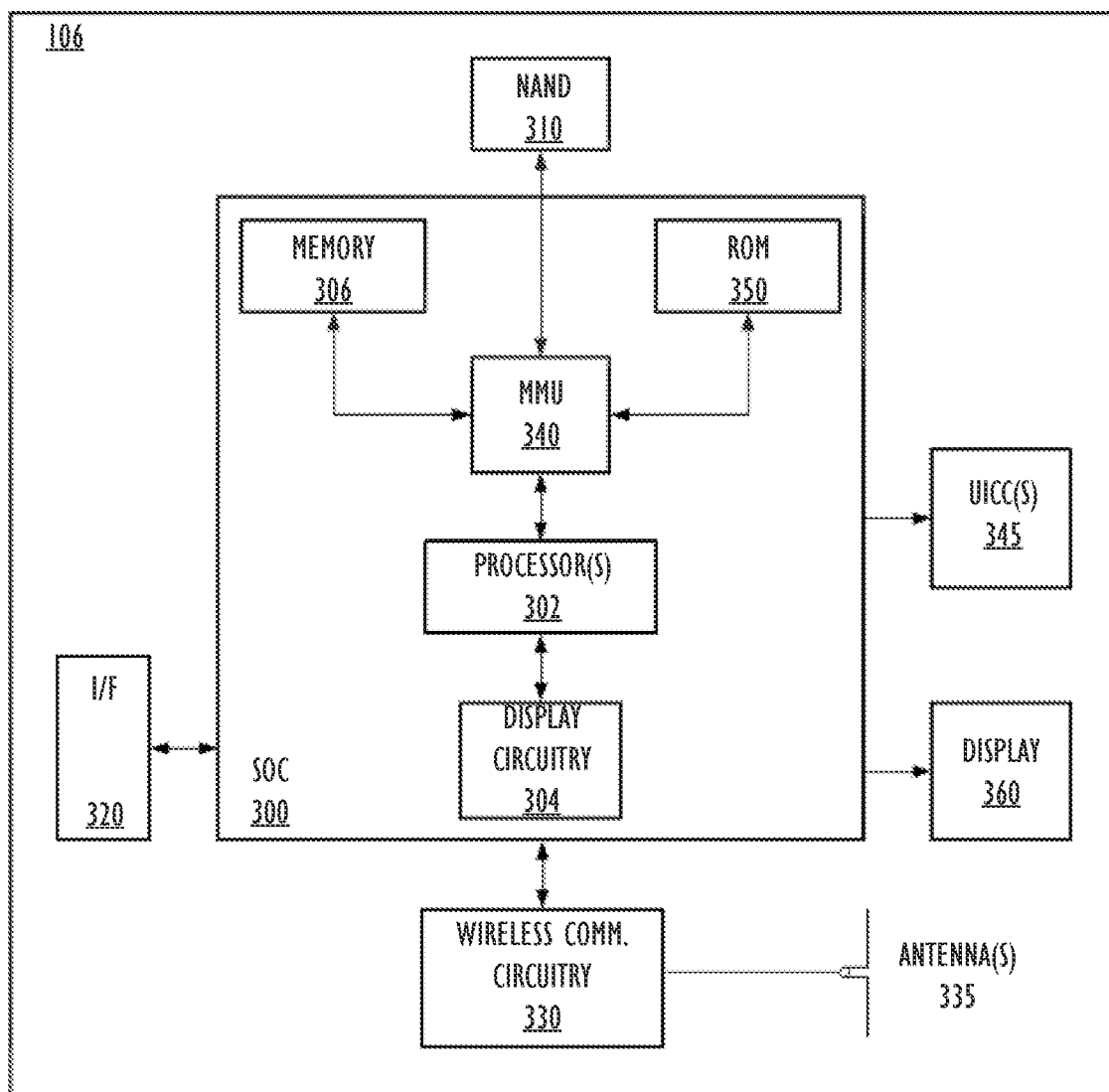
FIG. 3 illustrates an example block diagram of a UE, according to some Embodiments.

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash memory 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some embodiments, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Example Base Station

Figure 4:
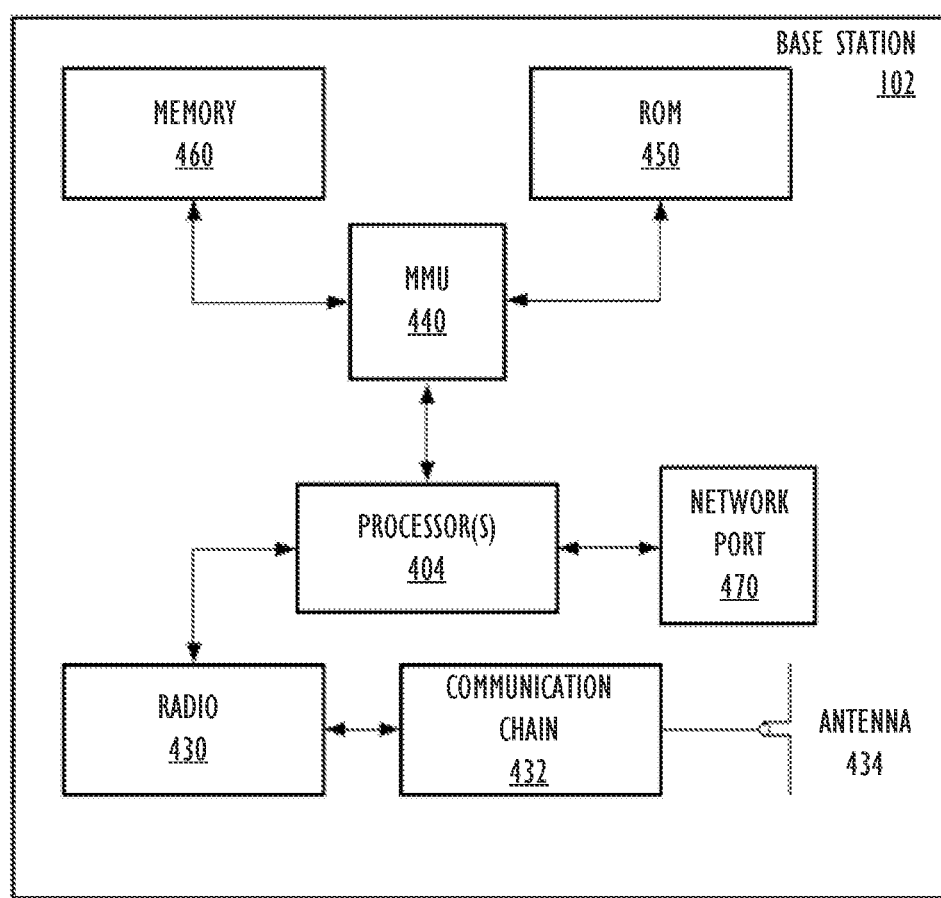
FIG. 4 illustrates an example block diagram of a BS, according to some embodiments.

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB." In such embodiments, base station 102 may be connected to a legacy evolved packet core (EPC) network and/or to a NR core (NRC)/5G core (5GC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio, which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Example Cellular Communication Circuitry

Figure 5:
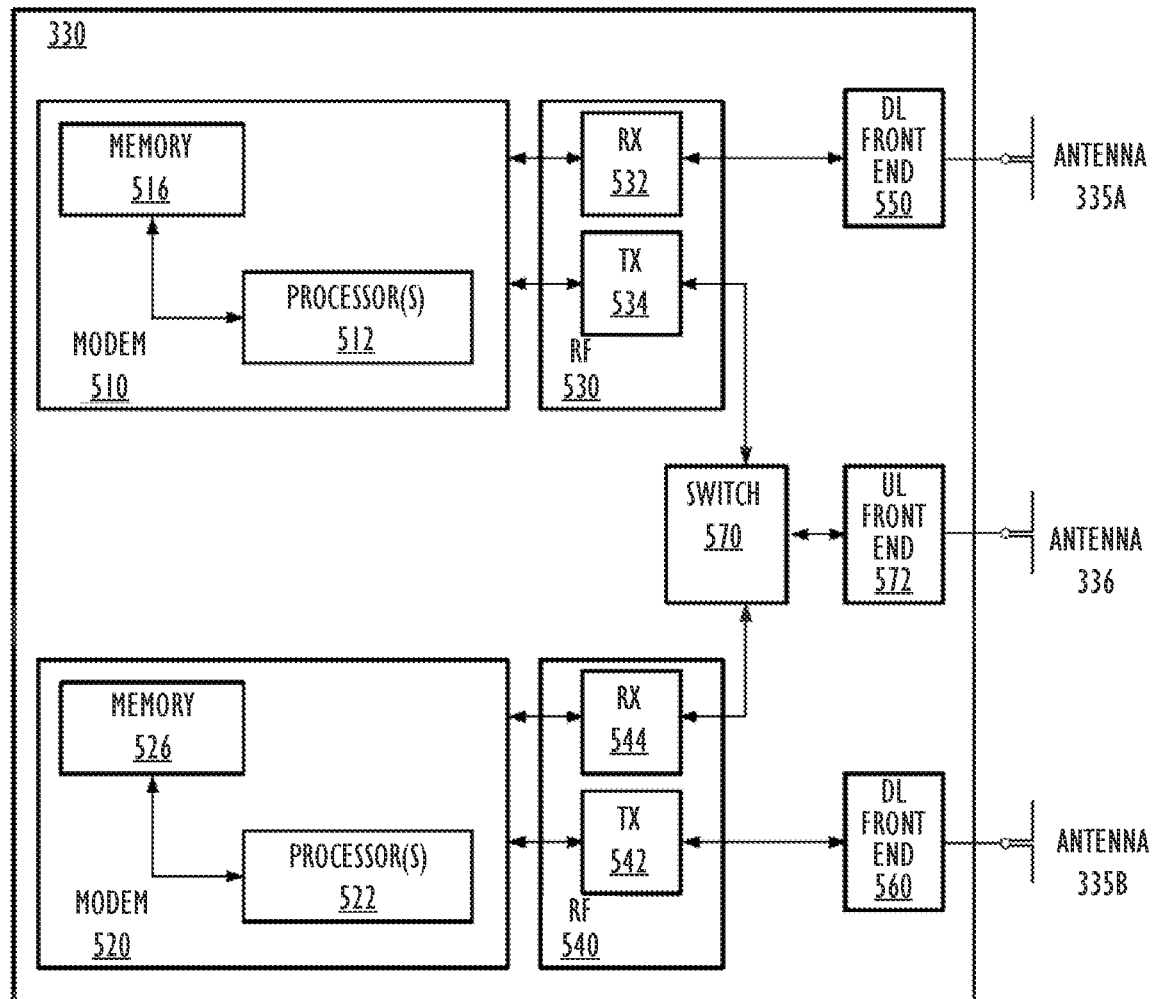
FIG. 5 illustrates an example block diagram of cellular communication circuitry, according to some embodiments.

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown. In some embodiments, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335b.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some embodiments, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335a. In some embodiments, the cellular communication circuitry 330 may also not include the switch 570, and the RF front end 530 or the RF front end 540 may be in communication, e.g., directly, with the UL front end 572.

Example Network Element

Figure 6:
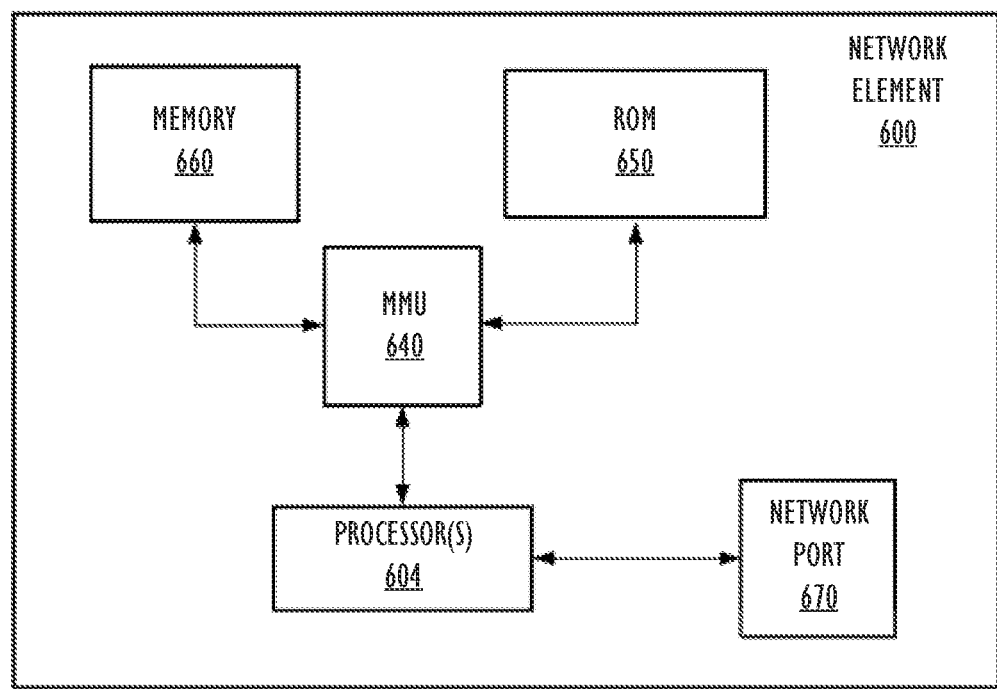
FIG. 6 illustrates an example block diagram of a network element, according to some embodiments.

FIG. 6 illustrates an exemplary block diagram of a network element 600, according to some embodiments. According to some embodiments, the network element 600 may implement one or more logical functions/entities of a cellular core network, such as a mobility management entity (MME), serving gateway (S-GW), access and management function (AMF), session management function (SMF), network slice quota management (NSQM) function, etc. It is noted that the network element 600 of FIG. 6 is merely one example of a possible network element 600. As shown, the core network element 600 may include processor(s) 604 which may execute program instructions for the core network element 600. The processor(s) 604 may also be coupled to memory management unit (MMU) 640, which may be configured to receive addresses from the processor(s) 604 and translate those addresses to locations in memory (e.g., memory 660 and read only memory (ROM) 650) or to other circuits or devices.

The network element 600 may include at least one network port 670. The network port 670 may be configured to couple to one or more base stations and/or other cellular network entities and/or devices. The network element 600 may communicate with base stations (e.g., eNBs/gNBs) and/or other network entities/devices by means of any of various communication protocols and/or interfaces.

As described further subsequently herein, the network element 600 may include hardware and software components for implementing and/or supporting implementation of features described herein. The processor(s) 604 of the core network element 600 may be configured to implement or support implementation of part or all of the methods described herein, e.g., by executing program instructions stored on a memory medium (e.g., a nontransitory computer-readable memory medium). Alternatively, the processor 604 may be configured as a programmable hardware element, such as an FPGA (Field Programmable Gate Array), or as an ASIC (Application Specific Integrated Circuit), or a combination thereof.

Figure 7:
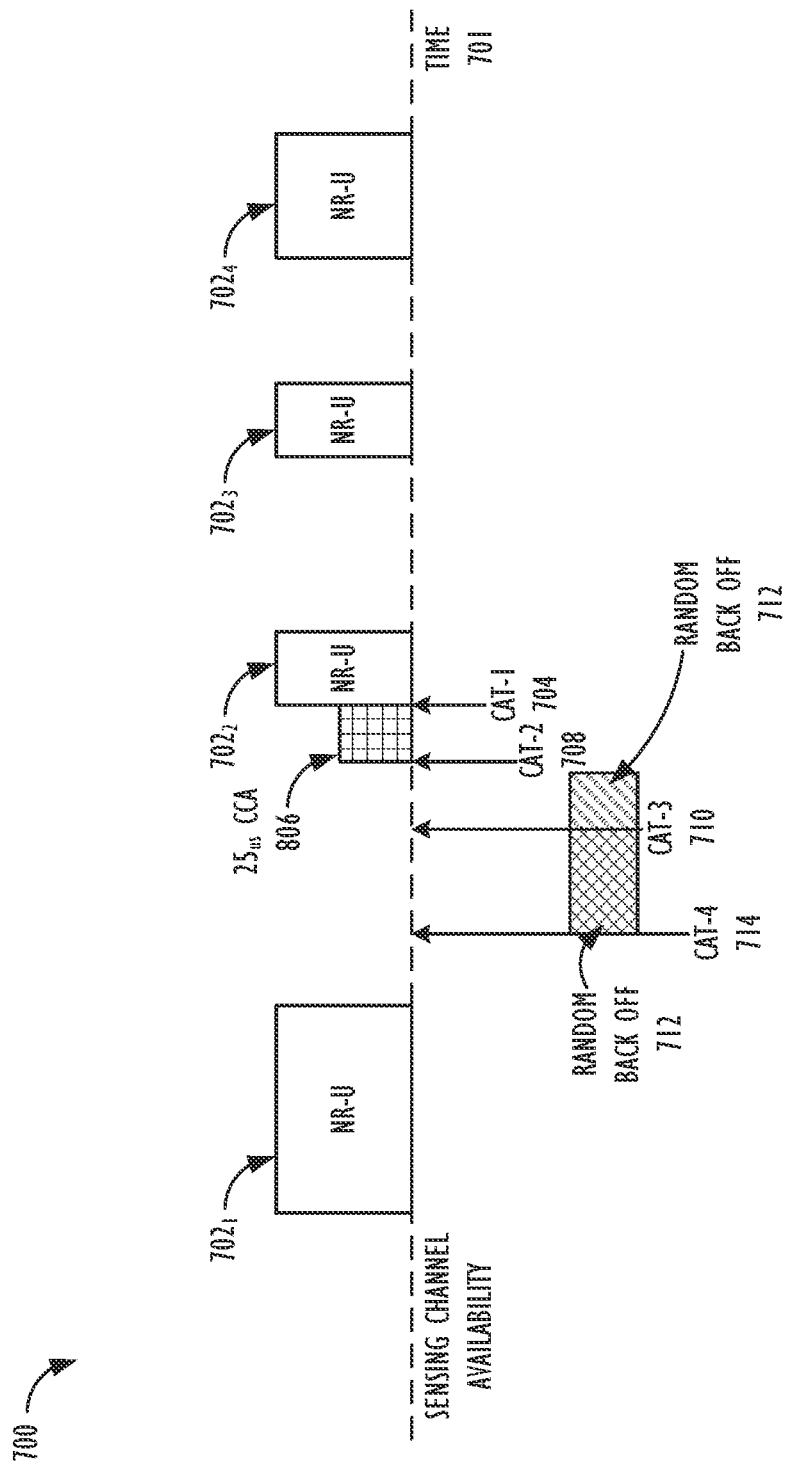
FIG. 7 is a timing diagram illustrating an unlicensed band channel access procedure, in accordance with aspects of the present disclosure.

FIG. 7 is a timing diagram illustrating an unlicensed band channel access procedure 700, in accordance with aspects of the present disclosure. As unlicensed bands are accessible publicly, other devices may be transmitting on the unlicensed bands. Additionally, devices which operate on unlicensed bands are often expected to attempt to minimize interference with other devices also operating on the unlicensed bands. To help share access to the unlicensed bands, wireless devices, such as UEs, may be configured to listen-before-talk (LBT). In LBT, the wireless device listens on the unlicensed band that the wireless device wants to use (e.g., use for transmitting or receiving signals, such as a reference signal like a pathloss reference signal, or other type of data signal) to determine whether the unlicensed band is already in use. If the wireless device determines that the unlicensed band is not in use, then the wireless device may transmit on the unlicensed band (e.g., obtain access to the unlicensed band). LBT may be implemented in many ways. One implementation is load based equipment (LBE), in which channel sensing of the unlicensed band may be performed at any time as needed by a wireless device. Multiple categories of LBE may be defined for interoperability of multiple devices associated with a particular type of wireless network. For example, in certain wireless networks, categories of LBT may be defined and wireless devices may implement one or more categories of LBT. FIG. 7 illustrates wireless transmissions 702$_1$-702$_4$ by NR unlicensed band (NR-U) devices on the unlicensed band over time 701 with examples of four categories of LBT support (e.g., NR-U LBT categories). Devices which support category 1 (CAT-1) 704 may transmit 702$_2$ on the unlicensed based immediately without listening 704 on the unlicensed band first (e.g., no LBT). Devices which support category 2 (CAT-2) may sense the licensed band for a fixed amount of time without a random back-off period. If the CAT-2 device senses 708 that no other devices are transmitting during the CCA period, the CAT-2 device begins transmitting after the CCA period 706 ends. If another transmission is detected during the CCA period 706, then the CAT-2 device does not transmit. Devices which support category 3 (CAT-3) may first wait for the unlicensed band to be idle for a time period, such as 16 μs, and then sense 710 within a fixed sized contention window of time. If the CAT-3 device senses 710 that another device is transmitting during the contention window, then the CAT-3 device will back off for a random period of time 712 and try to sense 710 the unlicensed channel again. The CAT-3 device may sense at a random time within the fixed size (e.g., length) contention window. Sensing may be performed by detecting a power level on the unlicensed band and determining whether that the detected power level is below a threshold power level. If the CAT-3 device senses 710 that no other devices are transmitting during sensing, the CAT-3 device begins transmitting. Category 4 (CAT-4) devices are similar to CAT-3 devices except that CAT-4 devices sense 714 within a variable size contention window. Otherwise, back off and sensing in CAT-4 operates similarly to CAT-3.

Generally, uplink channel occupancy times (COT) of the unlicensed band may be initiated by a node or a wireless device. In a node initiated COT, the node may obtain access to the unlicensed band and transmit an indication to one or more UEs to transmit uplink bursts on one or more of physical uplink shared channel (PUSCH), physical uplink control channel (PUCCH), physical random access channel (PRACH), and/or sounding reference signal (SRS). For a wireless device initiated COT, the wireless device may obtain access to the unlicensed band, for example, using CAT-4 LBT process, and transmit an uplink control information (UCI) PUSCH.

Pathloss Reference Signal

Pathloss, in a wireless communications system, is a measurement of an attenuation in the power density of a wireless signal over a distance. Pathloss is a function of the environment as between a transmitter and receiver and the distance in between. In certain wireless systems, a node may transmit a pathloss reference signal (PLRS) to a wireless device. The PLRS may be any kind of predefined signal of a predefined time and frequency that may be used to estimate channel characteristics, such as power density attenuation. Often, PLRS are node specific and may be utilized by any wireless device connected to the node. Examples of PLRS include a synchronization signal block (S-block) and channel state information reference signal (CSI-RS). The wireless device may measure the PLRS to estimate pathloss as between a signal between the node and the wireless device and use this estimated pathloss to determine a power setting for an uplink signal sent from the UE to the node. The wireless device may need to receive multiple samples of the PLRS to obtain a reliable measurement.

In wireless systems operating in licensed bands, access to the bands may be directed by one or more nodes. For example, a node may schedule certain time and frequencies for wireless devices to transmit. In such systems, a PLRS signal may be scheduled and transmitted at the scheduled time/frequency. In the case of wireless systems operating on unlicensed bands, the wireless systems are often expected to attempt to minimize interference with other devices also operating on the unlicensed bands, often by using an LBT process. If, during the LBT, a wireless device detects another wireless device on the unlicensed band, the wireless device will back-off and not transmit for a period. This could cause a PLRS transmission not to be sent.

Figure 8:
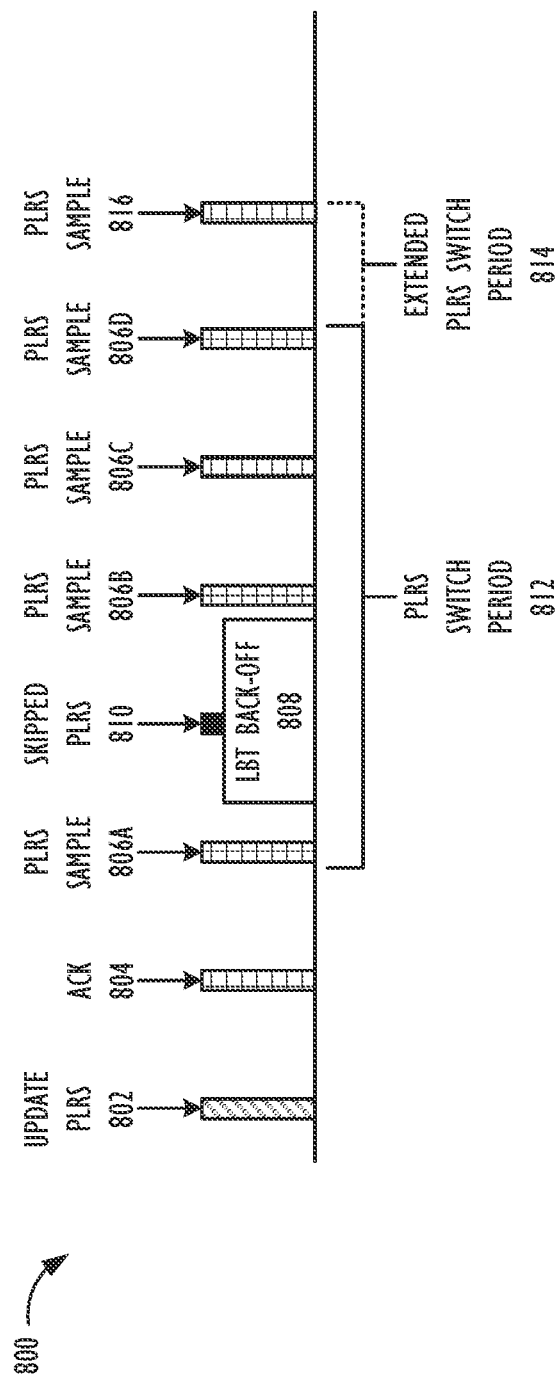
FIG. 8 is a timing diagram illustrating a PLRS measurement process in an unlicensed band, in accordance with aspects of the present disclosure.

FIG. 8 is a timing diagram illustrating a PLRS measurement process in an unlicensed band 800, in accordance with aspects of the present disclosure. A second wireless device may receive a request to update (e.g., switch) a pathloss measurement 802 from a first wireless device. In certain cases, the first wireless device may be a wireless node of a wireless network and the second wireless device may be a user equipment or device. In certain cases, a request to switch PLRS may also cause a wireless device to perform a PLRS measurement procedure to update the pathloss measurement. The second wireless device may transmit an acknowledgement 804 and perform a PLRS measurement procedure. In performing the PLRS measurement procedure, the second wireless device listens for PLRS samples transmitted from the first wireless device, including transmitted PLRS samples (806A-806D, collectively 806). The PLRS samples may be transmitted periodically and have a periodicity expressed as $T_{target\_PLRS}$. In this example, the second wireless device may need to receive five (n=5) PLRS samples to accumulate a sufficient number of PLRS samples to perform a reliable PLRS measurement procedure. Prior to each transmission, the first wireless device may perform an LBT procedure (not shown). In this example, an LBT procedure may be performed prior to transmitting PLRS sample 806A and if no other transmissions are sensed during an LBT window, then PLRS sample 806A is transmitted. However, if first wireless device senses a transmission during another LBT procedure, the first wireless device may perform an LBT back-off 808 and skip transmitting PLRS 810. In certain cases, the second wireless device may have a PLRS switch period 812 to receive and perform a pathloss measurement. This PLRS switch period 812 may have a time period defined by $n \times T_{target\_PLRS}$. However, as the first wireless device performed LBT back-off 808, only four PLRS samples were received during the PLRS switch period 812. In accordance with aspects of the present disclosure, the second wireless device may extend the PLRS switch period 814 to receive PLRS sample 816. An amount of time to extend the PLRS switch period 814 may be based on a number of PLRS samples 806 received during the initial PLRS switch period 812. In this example, as one PLRS sample was not available, the second wireless device may extend the PLRS switch period 814 by one PLRS sample period such that the entire sample period may be expressed as $n+1 \times T_{target\_PLRS}$.

Figure 9:
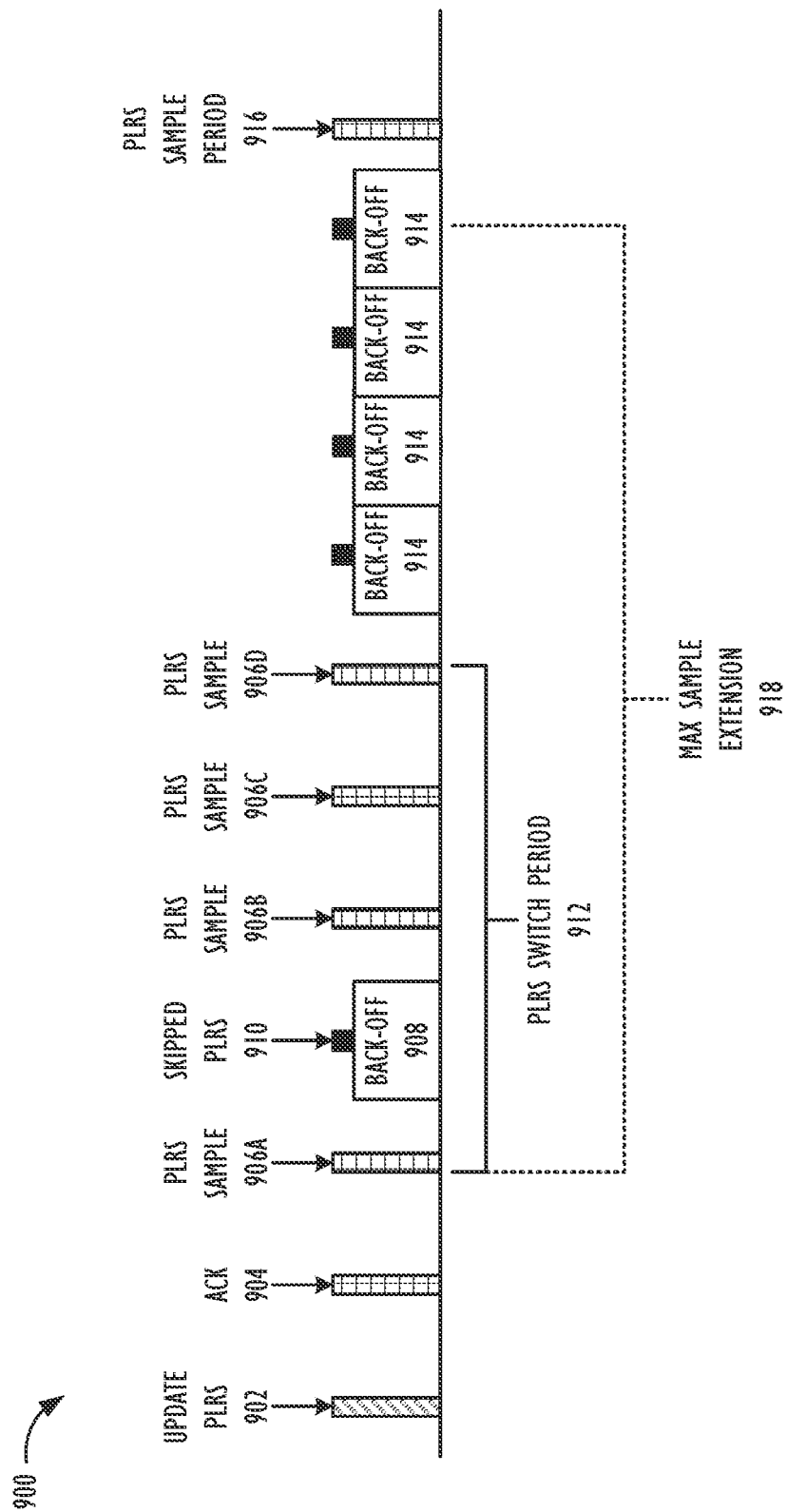
FIG. 9 is a timing diagram illustrating a PLRS measurement process in an unlicensed band, in accordance with aspects of the present disclosure.

FIG. 9 is a timing diagram illustrating a PLRS measurement process in an unlicensed band 900, in accordance with aspects of the present disclosure. Similar to FIG. 8, a first wireless device may receive a request to update a pathloss measurement 902 and the first wireless device may transmit an acknowledgement 904. The first wireless device then attempts to transmit a set of n PLRS samples (906A-906D, collectively 906). As before, the second wireless device may need to receive five (n=5) PLRS samples to accumulate a sufficient number of PLRS samples to perform a reliable measurement, and one PLRS sample is skipped 910 due to a LBT back-off 908 and only four PLRS samples were received during the PLRS switch period 912. The second wireless device may attempt to extend the PLRS switch period to receive additional PLRS samples. However, in this example, first wireless device senses a transmission during the next four PLRS transmission periods and performs LBT back-offs 914 during the four PLRS transmission periods. In certain cases, as the next PLRS sample period 916 is too far apart in time from the previous PLRS sample 906D and the second wireless device may not be able to reliably accumulate the next PLRS sample period 916 along with the other PLRS samples 906. In certain cases, a maximum number of sample extensions ($L_{meas\_PLRS, max}$) 918 may be defined. For example, the maximum number of sample extensions may be a predefined number of samples, or multiple maximum number of samples may be defined for different conditions. In certain cases, the maximum number of samples may be based on a predefined time limit, such as 1,400 ms. This time limit may be an absolute time limit, or multiple time limits defined for different conditions. In certain cases, the exact maximum number of sample extensions may vary and may be based on PLRS periodicity and/or discontinuous reception (DRX) cycle configured for the wireless device performing the PLRS measurements. In certain cases, if the maximum number of sample extensions ($L_{meas\_PLRS,\,max}$) 918 is reached or exceeded over a period of PLRS measurement or PLRS switching, the wireless device performing the PLRS measurement or PLRS switching may restart the PLRS measurement or PLRS switching procedure. The previously measured PLRS samples, such as for PLRS samples 906A-906D, may be discarded and a new PLRS measurement or PLRS switching may be started based on the next PLRS sample, here received during PLRS sample period 916.

Figure 10:
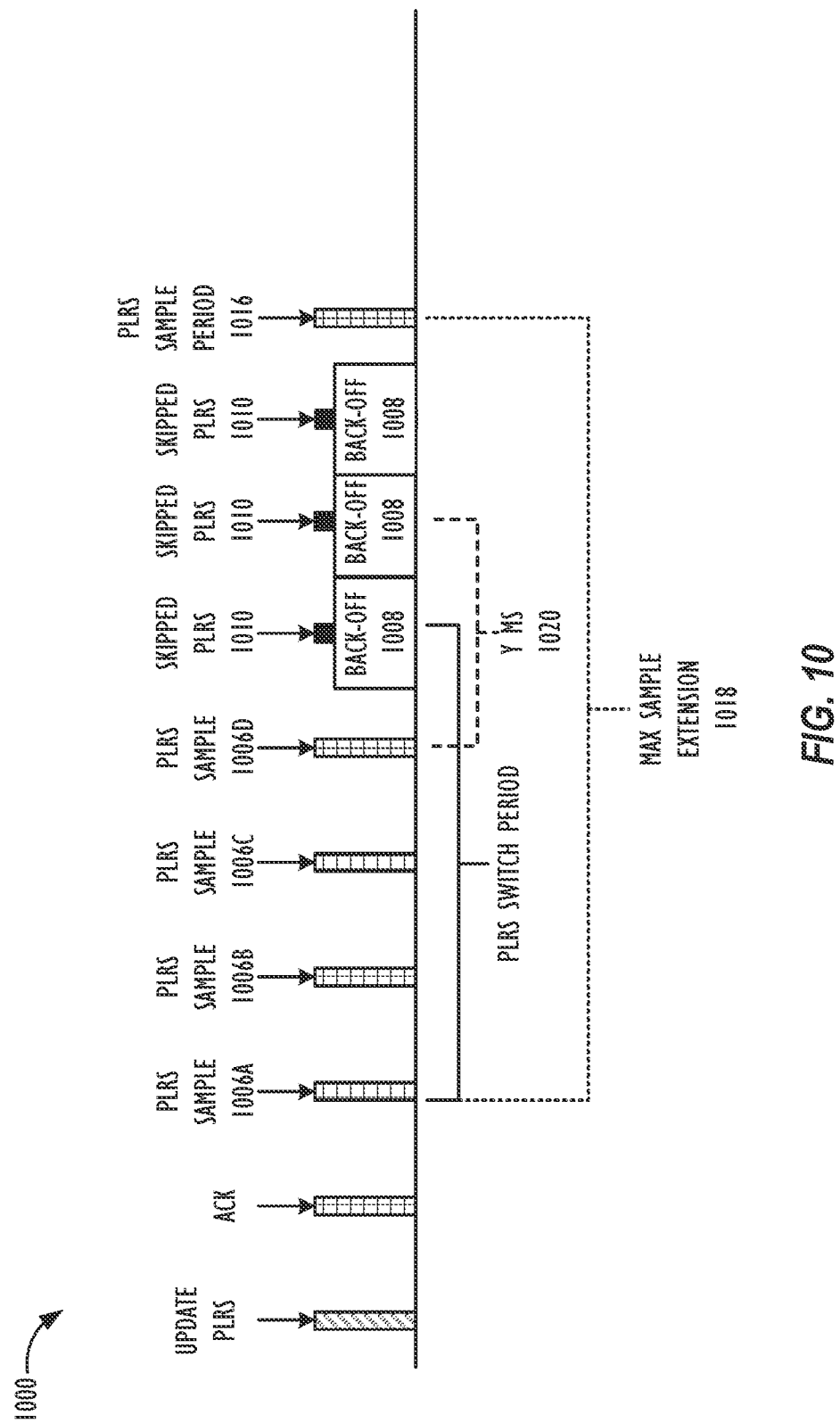
FIG. 10 is a timing diagram illustrating a PLRS measurement process, in accordance with aspects of the present disclosure.

In certain cases, PLRS accumulation over multiple PLRS samples may be degraded if a time gap between two received PLRS samples exceeds a threshold. This sample gap threshold may be measured in terms of time and/or number of PLRS samples and may operate as a sliding window over the received samples. FIG. 10 is a timing diagram illustrating a PLRS measurement process 1000, in accordance with aspects of the present disclosure. In this example, the sample gap threshold for two received PLRS samples may not be more than a maximum time Y ms 1020. In certain cases, the sample gap threshold may be adjusted based on a speed at which the first wireless device is moving. Here, a first wireless device attempts to transmit a set of n PLRS samples (1006A-1006D, collectively 1006). As before, the second wireless device may need to receive five (n=5) PLRS samples to accumulate a sufficient number of PLRS samples to perform a reliable measurement, and three PLRS samples are skipped 1010 due to LBT back-offs 1008. While still within a maximum number of sample extensions ($L_{meas\_PLRS,\,max}$) 1018, in this example, the sample gap threshold, here Y ms 1020 as between PLRS sample 1006D and PLRS sample period 1016 is exceeded. Thus, the wireless device performing the PLRS measurement or PLRS switching may restart the PLRS measurement or PLRS switching procedure, discarding PLRS samples 1006A-1006D and starting a new PLRS measurement or PLRS switching during PLRS sample period 1016.

As indicated above, the exact maximum number of sample extensions may vary and may be based on PLRS periodicity configured for the wireless device performing the PLRS measurements. For example, a maximum number of sample extensions ($L_{meas\_PLRS,\,max}$) may be determined based on a PLRS periodicity ($T_{taret\_PLRS}$) (e.g., $T_{S\text{-}block}$ for S-block based PLRS) where different PLRS periodicities may be associated with different $L_{meas\_PLRS,\,max}$. In certain cases, shorter PLRS periodicities may be associated with larger $L_{meas\_PLRS,\,max}$ as the shorter PLRS periodicity (e.g., increased number of samples transmitted in a period of time) increases a number of PLRS sample opportunities for a given time period. For example, given a first PLRS periodicity ≤T1 with an associated first maximum number of sample extensions ($L_{meas\_PLRS,\,max}$)=m1, and a second PLRS periodicity >T1 with an associated second maximum number of sample extensions=m2, m1 would be greater or equal to m2.

In certain cases, the maximum number of sample extensions may be based in part on a discontinuous reception (DRX) cycle. Generally, a wireless device may use a set of resources (e.g., time, frequency) for downlink from the wireless network. DRX allows a wireless device to monitor for a signal from the wireless network with a subset of the resources. For example, DRX may follow a DRX cycle where for a first period of time the wireless device is in an active state to monitor for a signal from the wireless network, and during the remainder of the DRX cycle the wireless device may enter into a relatively lower power state (e.g., sleep state). In certain cases, the maximum number of sample extensions ($L_{meas\_PLRS,\,max}$) may be determined by a maximum of either the DRX-on cycle time and the PLRS periodicity (e.g., $L_{meas\_PLRS,\,max}$=MAX(DRX cycle periodicity, $T_{target\_PLRS}$). Thus, a shorter DRX-on cycle and PLRS periodicity may be associated with a larger or equal maximum number of sample extensions. For example, if the wireless device is not configured with DRX (e.g., DRX=0), PLRS periodicity ≤40 ms, the maximum number of sample extensions may be m1, if the DRX cycle and PLRS periodicity is between 40 ms and 320 ms, the maximum number of sample extensions may be m2, and if the DRX cycle and PLRS periodicity is >320 ms, the maximum number of sample extensions may be m3. In such cases, m1>m2>m3.

In certain cases, a speed at which the wireless device is moving at may influence the maximum number of sample extensions ($L_{meas\_PLRS,\,max}$). In certain cases, the UE may adjust the maximum number of sample extensions based on the speed the UE is travelling at. For example, a smaller maximum number of sample extensions ($L_{meas\_PLRS,\,max}$) may be applied when the UE is moving at a higher speed and a larger maximum number of sample extensions ($L_{meas\_PLRS,\,max}$) may be applied while the wireless device is moving at a slower speed.

In certain cases, a first wireless device may indicate to a second wireless device to switch to a target wireless resource. This target wireless resource may be associated with a target PLRS and the second wireless device may switch to the target PLRS. This PLRS switching may be performed on a known PLRS or an unknown PLRS. Generally, a target PLRS is known if the target PLRS has been, under certain conditions, measured prior to switching. In certain cases, for unlicensed bands, the target PLRS is known if a set of conditions are met during a period between the last transmission, by the second wireless device, of a level 1 reference signal received power (L1-RSRP) measurement reporting for the target PLRS, or measurement reporting for another reference signal that is quasi-co-located with the PLRS, and the completion of the PLRS switch. Generally, reference signals may be quasi-co-located if properties of the channel over which a symbol of the reference signal on one antenna port is conveyed can be inferred from the channel over which a symbol of the reference signal on the other antenna port is conveyed.

The set of conditions may include that the PLRS switch command is received within a certain time period within the last successful transmission (e.g., without LBT failure) of the target PLRS for beam reporting or measurement. For example, the condition may be met if a previous PLRS signal was previously received without an LBT failure within a certain number of ms (such as Si). An example of the certain number of ms may be 1280 ms. The set of conditions may also include that the second wireless device has transmitted at least 1 L1-RSRP report for the target PLRS before the PLRS switch command. The set of conditions may also include, if the target PLRS is S-block based, the target PLRS should remain detectable (e.g., not subject to LBT failure) during the PLRS switching period in the occasions where the S-block signal is available at the second wireless device, or, if the target PLRS is CSI-RS based, the target PLRS should remain detectable (e.g., not subject to LBT failure) during the PLRS switching period in the occasions where the CSI-RS signal is available at the second wireless device. The set of conditions may also include that the signal-to-noise (SNR) ratio of the target PLRS is greater than a certain threshold SNR. For example, that the target PLRS has a SNR≥−3 dB. If the set of conditions are not met, then the target PLRS may be unknown to the second wireless device. In certain cases, the second wireless device may require more time to perform the PLRS switch for unknown PLRS, for example, as the second wireless device may need more time to perform time and/or frequency tracking for the target PLRS, and possibly beam refinement for the PLRS.

When the target PLRS is known to the second wireless device, the PLRS switch period (which includes a time needed to perform a PLRS measurement) of the second wireless device may be defined as $$n + T_{HARQ} + \left\lceil \frac{3 \text{ ms} + (k + L_{means\_PLRS}) * T_{target\_PLRS} + 2 \text{ ms}}{\text{slot length}} \right\rceil,$$

where $T_{HARQ}$ is the timing between DL data transmission and acknowledgement as specified in TS 38.213, where $L_{meas\_PLRS}$ is a number of S-Block occasions configured for PLRS not available at the second wireless device during a PLRS switch delay period, where $L_{meas\_PLRS}$ <$L_{meas\_PLRS,\ max}$, where $T_{target\_PLRS}$ is a periodicity of the target PLRS for the S-block, and where k is a baseline sample number for PLRS measurements.

In certain cases, a receive beam to the second wireless device may be changed during the PLRS measurement procedure. For example, if the second wireless device moves in such a way that a directional beamformed beam from the transmitter is no longer able to target the second wireless device, the second wireless device may be switched to another beam. In cases where the receive beam is changed, the second wireless device may continue to perform measurements based on the previous beam for the expected number of PLRS samples and not perform PLRS measurements as against the new beam until the expected number of samples are received (or the maximum extension period reached). Alternatively, in such cases, the second wireless device may drop the previous PLRS measurements based on the previous receive beam and restart PLRS measurements based on the new receive beam.

Figure 11:
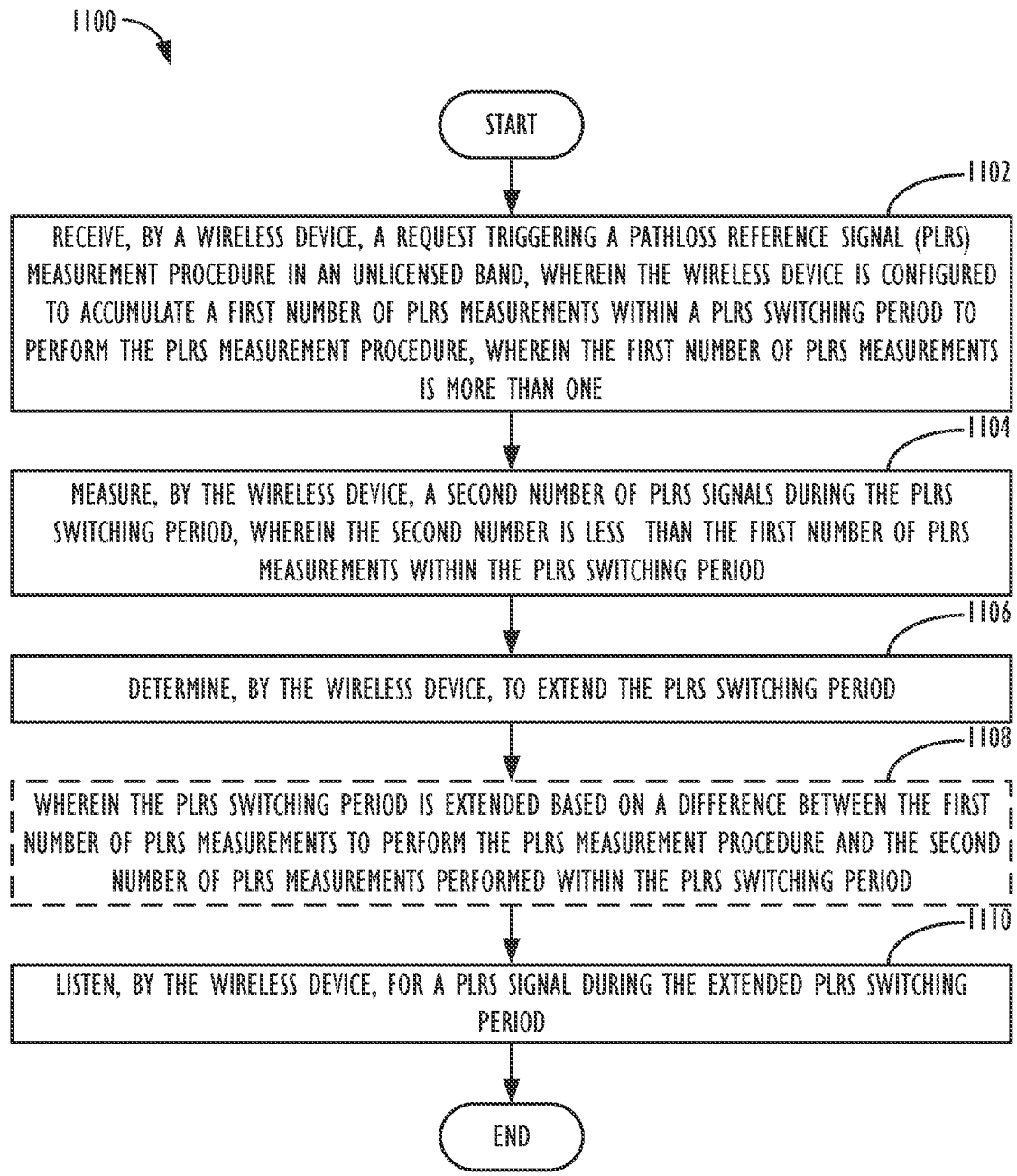
FIG. 11 is a flow diagram illustrating a technique for communications in a wireless system, in accordance with aspects of the present disclosure.

FIG. 11 is a flow diagram 1100 illustrating a technique for communications in a wireless system, in accordance with aspects of the present disclosure. At block 1102, a wireless device receives a request to perform a pathloss reference signal (PLRS) measurement procedure in an unlicensed band, wherein the wireless device is configured to accumulate a first number of PLRS measurements within a PLRS switching period to perform the PLRS measurement procedure, wherein the first number of PLRS measurements is more than one. For example, a wireless device operating in an unlicensed band may accumulate a sufficient number of PLRS measurements to perform a reliable PLRS measurement procedure. If the wireless device receives a request to switch PLRS or update a PLRS measurement, the wireless device may start listening for and measuring received PLRS signals. In certain cases, a length of the PLRS switching period is based, at least in part on whether the wireless device has transmitted a measurement report for a reference signal that is quasi-co-located (QCL) with the PLRS signal. At block 1104, the wireless device measures a second number of PLRS signals during the PLRS switching period, wherein the second number is less than the first number of PLRS measurements within the PLRS switching period. For example, the wireless device transmitting the PLRS signals may perform an LBT procedure prior to transmitting the PLRS signals. During an LBT procedure, another transmission may be detected and a corresponding PLRS signal may be skipped. As the PLRS signal is skipped, the wireless device performs fewer PLRS measurements during the PLRS switching period than the wireless device is configured to use to perform the PLRS measurement procedure. At block 1106, the wireless device determines to extend the PLRS switching period. Optionally, at block 1108, the PLRS switching period is extended based on a difference between the first number of PLRS measurements to perform the PLRS measurement procedure and the second number of PLRS measurements performed within the PLRS switching period. For example, the wireless device may extend the PLRS switching period based on the PLRS periodicity to enable the wireless device to receive additional PLRS signals to user for the PLRS measurement procedure. At block 1110, the wireless device listens for a PLRS signal during the extended PLRS switching period.

Figure 12:
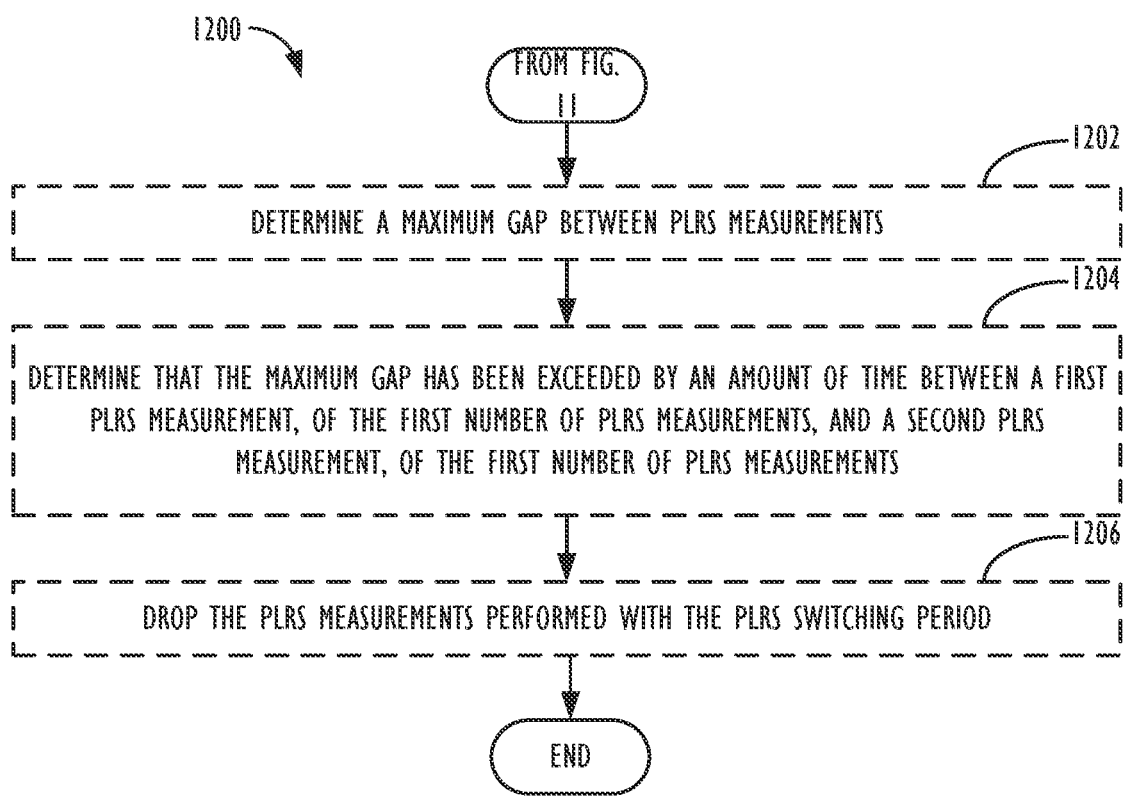
FIG. 12 is a flow diagram illustrating optional ways for communications in a wireless system, in accordance with aspects of the present disclosure.

FIG. 12 is a flow diagram 1200 illustrating optional ways for communications in a wireless system, in accordance with aspects of the present disclosure. Flow diagram 1200 extends the flow diagram 11 of FIG. 11 and illustrates optional aspects of the present disclosure. At block 1202, the wireless device determines a maximum gap between PLRS measurements. For example, PLRS accumulation over multiple PLRS samples may be degraded if a time gap as be two PLRS samples exceeds a maximum time gap. This time gap may be predetermined based on a certain time frame, or number of sample opportunities and may be adjusted based on a speed at which the wireless device is moving. At block 1204, a determination is made that the maximum gap has been exceeded by an amount of time between a first PLRS measurement, of the first number of PLRS measurements, and a second PLRS measurement, of the first number of PLRS measurements. At block 1206, the PLRS measurements performed with the PLRS switching period may be dropped. For example, the previous PLRS measurement procedure may be stopped, discarding the previously accumulated PLRS samples, and a new PLRS measurement procedure begun if the maximum time gap between received PLRS samples is exceeded.

Figure 13:
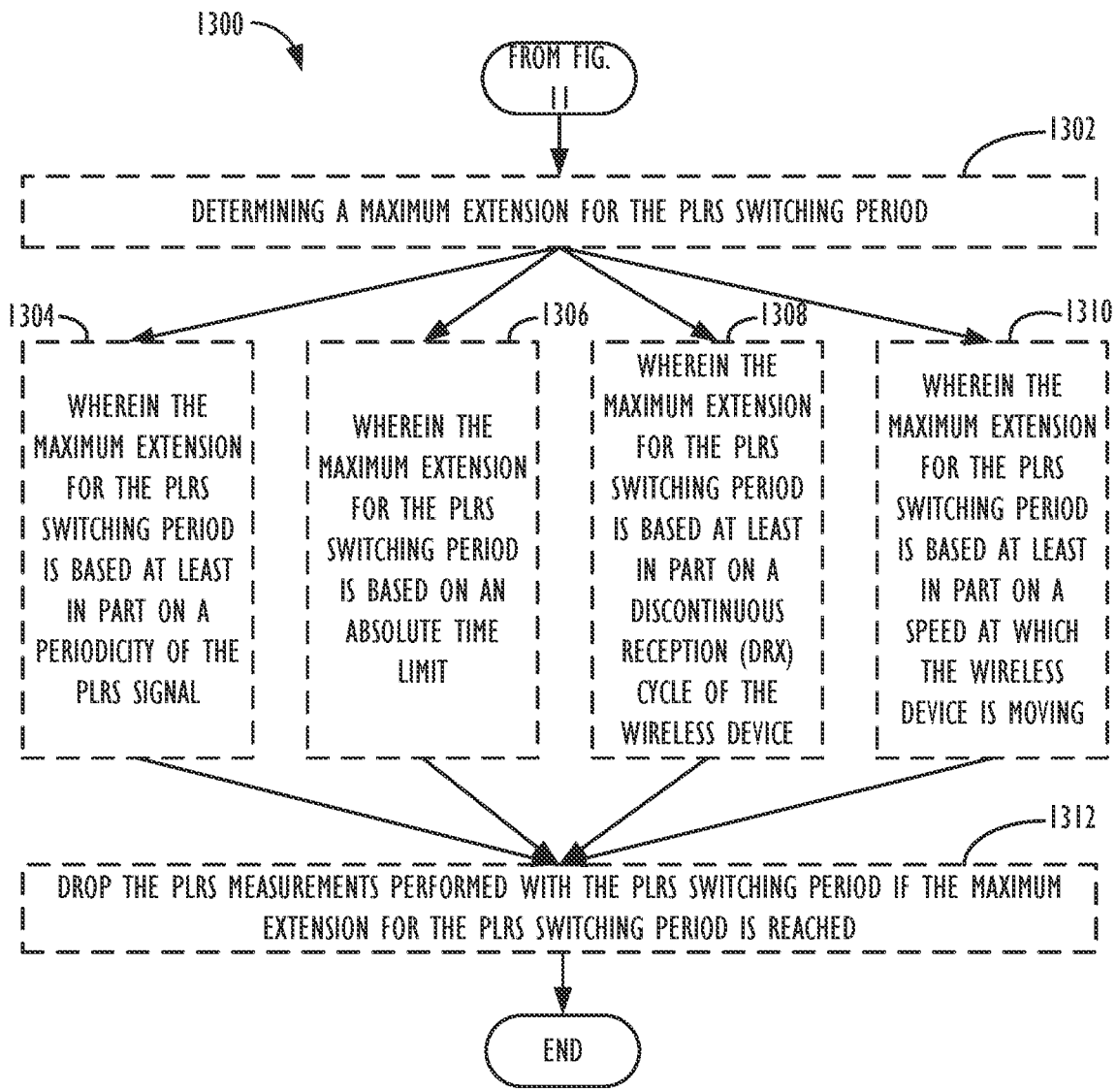
FIG. 13 is a flow diagram illustrating optional ways for communications in a wireless system, in accordance with aspects of the present disclosure.

FIG. 13 is a flow diagram 1300 illustrating optional ways for communications in a wireless system, in accordance with aspects of the present disclosure. Flow diagram 1300 extends the flow diagram 11 of FIG. 11 and illustrates optional aspects of the present disclosure. At block 1302, a maximum extension for the PLRS switching period is determined. The maximum extension for the PLRS switching period may be based on any, or all of, blocks 1304-1312. At block 1304, the maximum extension for the PLRS switching period is based at least in part on a periodicity of the PLRS signal. For example, the maximum extension of the switching period may take into account the amount of time between PLRS signals. At block 1306, the maximum extension for the PLRS switching period is based on an absolute time limit. For example, the maximum extension of the switching period may be a time limit, such as 1400 ms. At block 1308, the maximum extension for the PLRS switching period is based at least in part on a discontinuous reception (DRX) cycle of the wireless device. For example, the maximum extension of the switching period may take into account the amount of time needed for the DRX cycle of the wireless device. At block 1310, the maximum extension for the PLRS switching period is based at least in part on a speed at which the wireless device is moving. For example, the wireless device may adjust the number of PLRS sample extensions to be smaller when the wireless device is moving at faster speed.

Figure 14:
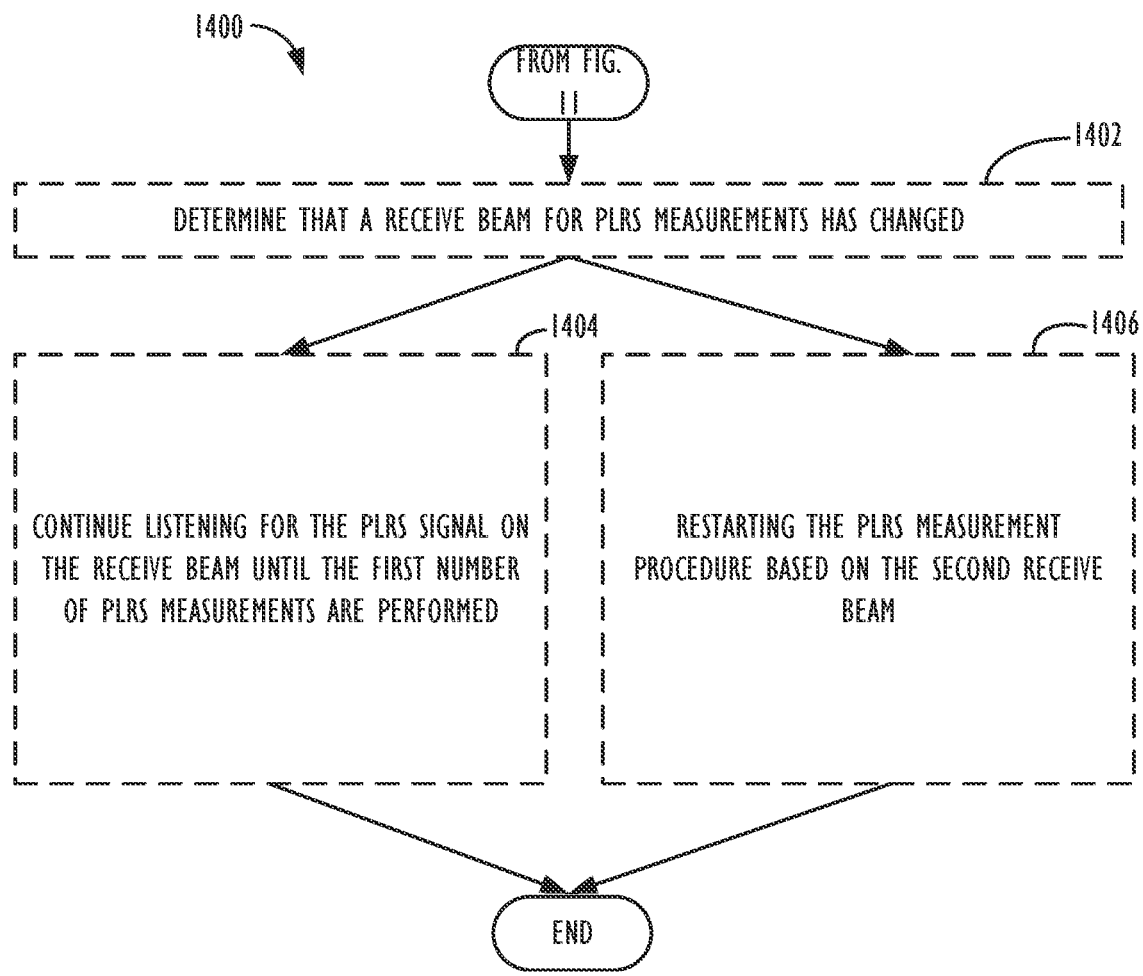
FIG. 14 is a flow diagram illustrating optional ways for communications in a wireless system, in accordance with aspects of the present disclosure.

FIG. 14 is a flow diagram 1400 illustrating optional ways for communications in a wireless system, in accordance with aspects of the present disclosure. Flow diagram 1400 extends the flow diagram 11 of FIG. 11 and illustrates optional aspects of the present disclosure. At block 1402, the wireless device determines that a receive beam for PLRS measurements has changed. For example, the wireless device may receive an indication that the receive beam has changed, or the wireless device may detect that the receive beam has changed, for example, based on characteristics of the beam. At block 1404, the wireless device may continue listening for the PLRS signal on the receive beam until the first number of PLRS measurements are performed, or if the maximum extension of the PLRS switching period is exceeded. Alternatively, at block 1406, the wireless device may restart the PLRS measurement procedure based on the changed receive beam. For example, the previous PLRS measurement procedure may be stopped, the previously accumulated PLRS samples dropped, and a new PLRS measurement procedure begun on a second, changed receive beam.

EXAMPLES

In the following sections, further exemplary embodiments are provided.

According to Example 1, a method for wireless networking, the method comprising: receiving, by a wireless device, a request triggering a pathloss reference signal (PLRS) measurement procedure in an unlicensed band, wherein the wireless device is configured to accumulate a first number of PLRS measurements within a PLRS switching period to perform the PLRS measurement procedure, wherein the first number of PLRS measurements is more than one; measuring, by the wireless device, a second number of PLRS signals during the PLRS switching period, wherein the second number is less than the first number of PLRS measurements within the PLRS switching period; determining, by the wireless device, to extend the PLRS switching period; and listening, by the wireless device, for a PLRS signal during the extended PLRS switching period.

Example 2 comprises the subject matter of example 1, wherein the PLRS switching period is extended based on a difference between the first number of PLRS measurements to perform the PLRS measurement procedure and the second number of PLRS measurements performed within the PLRS switching period.

Example 3 comprises the subject matter of example 1, further comprising: determining a maximum gap between PLRS measurements; determining that the maximum gap has been exceeded by an amount of time between a first PLRS measurement, of the first number of PLRS measurements, and a second PLRS measurement, of the first number of PLRS measurements; and dropping the PLRS measurements performed with the PLRS switching period.

Example 4 comprises the subject matter of example 1, further comprising: determining a maximum extension for the PLRS switching period; and dropping the PLRS measurements performed with the PLRS switching period if the maximum extension for the PLRS switching period is reached.

Example 5 comprises the subject matter of example 4, wherein the maximum extension for the PLRS switching period is based at least in part on a periodicity of the PLRS signal.

Example 6 comprises the subject matter of example 4, wherein the maximum extension for the PLRS switching period is based on an absolute time limit.

Example 7 comprises the subject matter of example 4, wherein the maximum extension for the PLRS switching period is based at least in part on a discontinuous reception (DRX) cycle of the wireless device.

Example 8 comprises the subject matter of example 4, wherein the maximum extension for the PLRS switching period is based at least in part on a speed at which the wireless device is moving.

Example 9 comprises the subject matter of example 1, wherein the PLRS switching period is based, at least in part on whether the wireless device has transmitted a measurement report for the target PLRS or for a reference signal that is quasi-co-located (QCL) with the target PLRS.

Example 10 comprises the subject matter of example 1, further comprising: determining that a receive beam for PLRS measurements has changed; and continue listening for the PLRS signal on the receive beam until the first number of PLRS measurements are performed.

Example 11 comprises the subject matter of example 1, further comprising:

determining that a first receive beam for PLRS measurements has changed to a second receive beam; and restarting the PLRS measurement procedure based on the second receive beam.

According to Example 12, a wireless device comprising: an antenna; a radio operably coupled to the antenna; and a processor operably coupled to the radio, wherein the wireless device is configured to: receive a request triggering a pathloss reference signal (PLRS) measurement procedure in an unlicensed band, wherein the wireless device is configured to accumulate a first number of PLRS measurements within a PLRS switching period to perform the PLRS measurement procedure, wherein the first number of PLRS measurements is more than one; measure a second number of PLRS signals during the PLRS switching period, wherein the second number is less than the first number of PLRS measurements within the PLRS switching period; determine to extend the PLRS switching period; and listen by the wireless device, for a PLRS signal during the extended PLRS switching period.

Example 13 comprises the subject matter of example 12, wherein the PLRS switching period is extended based on a difference between the first number of PLRS measurements to perform the PLRS measurement procedure and the second number of PLRS measurements performed within the PLRS switching period.

Example 14 comprises the subject matter of example 12, wherein the wireless device is further configured to: determine a maximum gap between PLRS measurements; determine that the maximum gap has been exceeded by an amount of time between a first PLRS measurement, of the first number of PLRS measurements, and a second PLRS measurement, of the first number of PLRS measurements; and drop the PLRS measurements performed with the PLRS switching period.

Example 15 comprises the subject matter of example 12, wherein the wireless device is further configured to: determine a maximum extension for the PLRS switching period;

and drop the PLRS measurements performed with the PLRS switching period if the maximum extension for the PLRS switching period is reached.

Example 16 comprises the subject matter of example 15, wherein the maximum extension for the PLRS switching period is based at least in part on a periodicity of the PLRS signal.

Example 17 comprises the subject matter of example 15, wherein the maximum extension for the PLRS switching period is based on an absolute time limit.

Example 18 comprises the subject matter of example 15, wherein the maximum extension for the PLRS switching period is based at least in part on a discontinuous reception (DRX) cycle of the wireless device.

Example 19 comprises the subject matter of example 15, wherein the maximum extension for the PLRS switching period is based at least in part on a speed at which the wireless device is moving.

Example 20 comprises the subject matter of example 12, wherein the PLRS switching period is based, at least in part on whether the wireless device has transmitted a measurement report for the target PLRS or for a reference signal that is quasi-co-located (QCL) with the target PLRS.

Example 21 comprises the subject matter of example 12, wherein the wireless device is further configured to: determine that a receive beam for PLRS measurements has changed; and continue listening for the PLRS signal on the receive beam until the first number of PLRS measurements are performed.

Example 22 comprises the subject matter of example 12, wherein the wireless device is further configured to: determine that a first receive beam for PLRS measurements has changed to a second receive beam; and restart the PLRS measurement procedure based on the second receive beam.

According to Example 23, a method that includes any action or combination of actions as substantially described herein in the Detailed Description.

According to Example 24, a method as substantially described herein with reference to each or any combination of the Figures included herein or with reference to each or any combination of paragraphs in the Detailed Description.

According to Example 25, a wireless device configured to perform any action or combination of actions as substantially described herein in the Detailed Description as included in the wireless device.

According to Example 26, a wireless station configured to perform any action or combination of actions as substantially described herein in the Detailed Description as included in the wireless station.

According to Example 27, a non-volatile computer-readable medium that stores instructions that, when executed, cause the performance of any action or combination of actions as substantially described herein in the Detailed Description.

According to Example 28, an integrated circuit configured to perform any action or combination of actions as substantially described herein in the Detailed Description.

Yet another exemplary embodiment may include a method, comprising: by a device: performing any or all parts of the preceding examples.

A yet further exemplary embodiment may include a non-transitory computer-accessible memory medium comprising program instructions which, when executed at a device, cause the device to implement any or all parts of any of the preceding examples.

A still further exemplary embodiment may include a computer program comprising instructions for performing any or all parts of any of the preceding examples.

Yet another exemplary embodiment may include an apparatus comprising means for performing any or all of the elements of any of the preceding examples.

Still another exemplary embodiment may include an apparatus comprising a processor configured to cause a device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE 106, a BS 102, a network element 600) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for wireless networking, the method comprising:

receiving, by a wireless device, a request triggering a pathloss reference signal (PLRS) measurement procedure in an unlicensed band, wherein the wireless device is configured to accumulate a first number of PLRS measurements within a PLRS switching period to perform the PLRS measurement procedure, wherein the first number of PLRS measurements is more than one;

measuring, by the wireless device, a second number of PLRS signals during the PLRS switching period, wherein the second number is less than the first number of PLRS measurements within the PLRS switching period;
determining, by the wireless device, to extend the PLRS switching period;
listening, by the wireless device, for a PLRS signal during the extended PLRS switching period:
determining a maximum extension for the PLRS switching period; and
dropping the PLRS measurements performed with the PLRS switching period if the maximum extension for the PLRS switching period is reached,
wherein the maximum extension for the PLRS switching period is based at least in part on a periodicity of the PLRS signal.

2. The method of claim 1, wherein the PLRS switching period is extended based on a difference between the first number of PLRS measurements to perform the PLRS measurement procedure and the second number of PLRS measurements performed within the PLRS switching period.

3. The method of claim 1, further comprising:
determining a maximum gap between PLRS measurements;
determining that the maximum gap has been exceeded by an amount of time between a first PLRS measurement, of the first number of PLRS measurements, and a second PLRS measurement, of the first number of PLRS measurements; and
dropping the PLRS measurements performed with the PLRS switching period.

4. The method of claim 1, wherein the maximum extension for the PLRS switching period is further based at least in part on a discontinuous reception (DRX) cycle of the wireless device.

5. The method of claim 1, wherein the maximum extension for the PLRS switching period is further based at least in part on a speed at which the wireless device is moving.

6. The method of claim 1, wherein the PLRS switching period is based, at least in part on whether the wireless device has transmitted a measurement report for a target PLRS or for a reference signal that is quasi-co-located (QCL) with the target PLRS.

7. The method of claim 1, further comprising:
determining that a receive beam for PLRS measurements has changed; and
continue listening for the PLRS signal on the receive beam until the first number of PLRS measurements are performed.

8. The method of claim 1, further comprising:
determining that a first receive beam for the PLRS measurement procedure has changed to a second receive beam; and
restarting the PLRS measurement procedure based on the second receive beam.

9. A wireless device comprising:
an antenna;
a radio operably coupled to the antenna; and
a processor operably coupled to the radio, wherein the wireless device is configured to:
receive a request triggering a pathloss reference signal (PLRS) measurement procedure in an unlicensed band, wherein the wireless device is configured to accumulate a first number of PLRS measurements within a PLRS switching period to perform the PLRS measurement procedure, wherein the first number of PLRS measurements is more than one;
measure a second number of PLRS signals during the PLRS switching period, wherein the second number is less than the first number of PLRS measurements within the PLRS switching period;
determine to extend the PLRS switching period;
listen by the wireless device, for a PLRS signal during the extended PLRS switching period;
determine a maximum extension for the PLRS switching period; and
drop the PLRS measurements performed with the PLRS switching period if the maximum extension for the PLRS switching period is reached,
wherein the maximum extension for the PLRS switching period is based at least in part on a periodicity of the PLRS signal.

10. The wireless device of claim 9, wherein the PLRS switching period is extended based on a difference between the first number of PLRS measurements to perform the PLRS measurement procedure and the second number of PLRS measurements performed within the PLRS switching period.

11. The wireless device of claim 9, wherein the wireless device is further configured to:
determine a maximum gap between PLRS measurements;
determine that the maximum gap has been exceeded by an amount of time between a first PLRS measurement, of the first number of PLRS measurements, and a second PLRS measurement, of the first number of PLRS measurements; and
drop the PLRS measurements performed with the PLRS switching period.

12. The wireless device of claim 9, wherein the maximum extension for the PLRS switching period is further based at least in part on a discontinuous reception (DRX) cycle of the wireless device.

13. The wireless device of claim 9, wherein the maximum extension for the PLRS switching period is further based at least in part on a speed at which the wireless device is moving.

14. The wireless device of claim 9, wherein the PLRS switching period is based, at least in part on whether the wireless device has transmitted a measurement report for a target PLRS or for a reference signal that is quasi-co-located (QCL) with the target PLRS.

15. The wireless device of claim 9, wherein the wireless device is further configured to:
determine that a receive beam for PLRS measurements has changed; and
continue listening for the PLRS signal on the receive beam until the first number of PLRS measurements are performed.

16. The wireless device of claim 9, wherein the wireless device is further configured to:
determine that a first receive beam for the PLRS measurement procedure has changed to a second receive beam; and
restart the PLRS measurement procedure based on the second receive beam.

17. A baseband processor configured to cause a wireless device to:
receive a request triggering a pathloss reference signal (PLRS) measurement procedure in an unlicensed band, wherein the wireless device is configured to accumulate a first number of PLRS measurements within a PLRS switching period to perform the PLRS measurement procedure, wherein the first number of PLRS measurements is more than one;

measure a second number of PLRS signals during the PLRS switching period, wherein the second number is less than the first number of PLRS measurements within the PLRS switching period;

determine to extend the PLRS switching period;

listen for a PLRS signal during the extended PLRS switching period;

determine a maximum extension for the PLRS switching period; and drop the PLRS measurements performed with the PLRS switching period if the maximum extension for the PLRS switching period is reached, wherein the maximum extension for the PLRS switching period is based at least in part on a periodicity of the PLRS signal.

18. The baseband processor of claim 17, wherein the PLRS switching period is extended based on a difference between the first number of PLRS measurements to perform the PLRS measurement procedure and the second number of PLRS measurements performed within the PLRS switching period.

19. The baseband processor of claim 17, wherein the baseband processor is further configured to cause the wireless device to:

determine that a first receive beam for the PLRS measurement procedure has changed to a second receive beam; and restart the PLRS measurement procedure based on the second receive beam.

* * * * *

UNITED STATES PATENT AND TRADEMARK OFFICE
CERTIFICATE OF CORRECTION

| | | |
|---|---|---|
| PATENT NO. | : 12,431,994 B2 | Page 1 of 1 |
| APPLICATION NO. | : 17/593838 | |
| DATED | : September 30, 2025 | |
| INVENTOR(S) | : Jie Cui et al. | |

It is certified that error appears in the above-identified patent and that said Letters Patent is hereby corrected as shown below:

On the Title Page

Item (86) PCT/CN2021/071859
§371 (c)(1),
(2) Date: delete "Jul. 21, 2022" and insert --September 24, 2021--

Signed and Sealed this
Ninth Day of December, 2025

John A. Squires
*Director of the United States Patent and Trademark Office*